(12) United States Patent
    Tan

(10) Patent No.: US 9,077,874 B2
(45) Date of Patent: Jul. 7, 2015

(54) MEMORY CARD AND METHOD FOR INITIATION OF STORAGE AND WIRELESS TRANSCEIVING OF DATA

(75) Inventor: Joon Yong Wayne Tan, Singapore (SG)

(73) Assignee: T-Data Systems (S) Pte Ltd, Singapore (SG)

( * ) Notice: Subject to any disclaimer, the term of this patent is extended or adjusted under 35 U.S.C. 154(b) by 211 days.

(21) Appl. No.: 13/806,427

(22) PCT Filed: Jun. 25, 2010

(86) PCT No.: PCT/SG2010/000237
§ 371 (c)(1),
(2), (4) Date: Dec. 21, 2012

(87) PCT Pub. No.: WO2011/162718
PCT Pub. Date: Dec. 29, 2011

(65) Prior Publication Data
US 2013/0113948 A1    May 9, 2013

(51) Int. Cl.
*H04N 5/76* (2006.01)
*H04N 5/225* (2006.01)
*H04N 21/418* (2011.01)
*H04N 21/422* (2011.01)
*H04N 21/4223* (2011.01)
*H04N 5/228* (2006.01)
*H04N 5/77* (2006.01)
*H04N 5/907* (2006.01)

(52) U.S. Cl.
CPC .............. *H04N 5/225* (2013.01); *H04N 5/772* (2013.01); *H04N 5/907* (2013.01); *H04N 21/4183* (2013.01); *H04N 21/4184* (2013.01); *H04N 21/42202* (2013.01); *H04N 21/4223* (2013.01)

(58) Field of Classification Search
CPC .......... H04N 5/23251; H04N 5/23258; H04N 1/2158; H04N 1/2129
USPC ................ 348/231.99, 231.7, 231.9, 211.99, 348/208.2
See application file for complete search history.

(56) References Cited

U.S. PATENT DOCUMENTS 6,375,572 B1 * 4/2002 Masuyama et al. ............. 463/43
2003/0003976 A1 1/2003 Mura

FOREIGN PATENT DOCUMENTS

| EP | 2160019 | * 3/2010 | ............. H04N 5/232 |
| WO | WO2007035275 A2 | 3/2007 | |
| WO | WO2009/147094 | * 12/2009 | ............. G06K 19/07 |
| WO | WO2009147094 A1 | 12/2009 | |

OTHER PUBLICATIONS

International Search Report Application No. PCT/SG2010/000237, Dated Sep. 7, 2010.

* cited by examiner

*Primary Examiner* — Kelly L Jerabek
(74) *Attorney, Agent, or Firm* — Kramer Levin Naftalis & Frankel LLP

(57) ABSTRACT

Disclosed is a memory card having a central processor, a wireless transceiver module operatively connected to the central processor, a storage module operatively connected to the central processor, and a movement sensor operatively connected to the central processor. The movement sensor is configured to provide operational signals to the central processor as a result of a detection of movement of defined characteristics.

16 Claims, 3 Drawing Sheets

US 9,077,874 B2

MEMORY CARD AND METHOD FOR INITIATION OF STORAGE AND WIRELESS TRANSCEIVING OF DATA

CROSS REFERENCE TO RELATED APPLICATIONS

This application is the United States national phase filing of the corresponding international application number PCT/SG2010/000237, filed on Jun. 25, 2010, and published as WO 2011/162718 A1, which application is hereby incorporated herein by reference in its entirety.

REFERENCE TO RELATED APPLICATIONS

Reference is made to our earlier international patent applications:
  PCT/SG2008/000327 filed 4 Sep. 2008 for an invention entitled "Method and Apparatus Card for Wireless Digital Content Management";
  PCT/SG2009/000279 filed 12 Aug. 2009 with a priority date of 4 Sep. 2008 for an invention entitled "Method and Memory Card for Wireless Digital Content Management";
  PCT/SG2009/000280 filed 12 Aug. 2009 with a priority date of 4 Sep. 2008 for an invention entitled "Method of Authentication for Memory Card";
  PCT/SG2009/000461 filed on 1 Dec. 2009 for an invention entitled "Method and Memory Card for Wireless Digital Content Management";
  PCT/SG2009/000480 filed on 16 Dec. 2009 for an invention entitled "Method of Converting Digital Data";
  PCT/SG2010/000012 filed on 19 Jan. 2010 with a priority date of 16 Dec. 2009 for an invention entitled "Method of Converting Digital Data";
  PCT/SG2010/000069 filed on 1 Mar. 2010 for an invention entitled "Memory Card";
  PCT/SG2010/000070 filed on 1 Mar. 2010 with a priority date of 1 Dec. 2009 for an invention entitled "Method and Memory Card for Wireless Digital Content Management"; and
  PCT/SG2010/000183 filed on 14 May 2010 with a priority date of 1 Dec. 2009 for an invention entitled "Memory Card and Method for Storage and Wireless Transceiving of Data"; ("our earlier applications") the contents of which are hereby incorporated by reference as if disclosed herein in their entirety.

TECHNICAL FIELD

This invention relates to a memory card and method for the initiation of storage and wireless transceiving of data and refers particularly, though not exclusively, to such a memory card and method using a movement sensor for initiating the storage and wireless transceiving of data by a digital camera in which the memory card is operatively engaged.

DEFINITIONS

Throughout this specification a reference to a digital camera is to be taken as including a reference to a digital camera, digital video camera, digital voice recorder, or digital diary.

Throughout this specification a reference to another digital device is to be taken as being a reference to a wireless-enabled personal computer, laptop computer, notebook computer, tablet computer, personal digital assistant, server, mobile telephone, or a cellular telephone; or a digital photo frame.

BACKGROUND

Digital cameras must be physically and electrically connected to a host computer to enable downloads and uploads of digital content. The digital content may be, for example, images, video images, marketing material, music content, and so forth. The application to manage and control uploads and downloads resides in the host computer. This is not always convenient.

This is because the digital camera has a processor that is incapable of independently exporting digital data captured by the digital camera. The digital camera requires a connection with the host computer to and the host computer imports the digital data captured by the digital camera, and the host computer exports digital data from the host computer to the digital camera. For all relevant functions the host computer controls the process. Alternatively, a memory card or similar non-volatile memory of the digital camera may be removed and inserted into the host computer for the digital data stored in the memory card to be uploaded to the host computer. Once stored in the host computer's memory, the digital data can be uploaded to a web site. For example, there are many web sites allowing the storing of personal photographs—"FaceBook" and "U-Tube" being but two of many examples. This requires access to a host computer for uploading to take place. This may not always be convenient. Also, there is a significant loss of data integrity at such sites.

As a digital camera does not inherently have a keyboard or keypad, proving instructions for the initiation of data storage or the transceiving of data will involve using normal digital camera functionality and controls to achieve a different result. However, in doing so the intuitive responses and actions of a user must be taken into account or misuse, errors, or accidental incorrect operations may take place. Also, a digital camera has a limited number of controls, all of which have defined functions. Providing different functionality to existing controls may cause user confusion and/or anxiety.

SUMMARY

According to an exemplary aspect there is provided a memory card comprising a central processor, a wireless transceiver module operatively connected to the central processor, a storage module operatively connected to the central processor, and a movement sensor operatively connected to the central processor and being configured to provide operational signals to the central processor as a result of a detection of movement of defined characteristics.

The movement sensor may comprise a movement feedback device selected from: a uni-axial movement sensor, a bi-axial movement sensor, and a tri-axial movement sensor. Additionally, the movement sensor may be selected from: a motion sensor and an accelerometer; and may additionally be configured to measure gravitational acceleration. The movement sensor may further comprise an analog-to-digital converter. Alternatively, the central processor may further comprise an analog-to-digital converter. Further alternatively, the analog-to-digital converter may be a separate component in the memory card and operatively connected to the movement sensor and the central processor. The memory card may further comprise at least one predetermined pattern of movement. The predetermined pattern of movement may be stored in one of: the central processor, or the storage module and being readable by the central processor.

According to another exemplary aspect there is provided a method for controlling the memory card wherein the movement sensor is able to detect and recognize an acceleration pattern on the basis of at least one acceleration of a digital camera in which the memory card is operatively receivable.

The at least one acceleration may comprise at least one tap to one of: a body of the digital camera, a display of the digital camera, and a control of the digital camera. The at least one tap may comprise a plurality of taps, the number of taps having different operational results. Alternatively, the at least one acceleration may comprise at least one short, sharp shake and/or rotation of the digital camera. The movement sensor may detect a movement of the movement sensor and, if the detected movement is not within at least one predetermined pattern of movement the detected movement may be ignored. Alternatively, if the detected movement is within the at least one predetermined pattern of movement at the central processor may undertake the instructed task. The movement sensor may produce an analog signal that is converted to a digital signal by an analog-to-digital converter. The analog-to-digital converter may be in one of: the movement sensor, the central processor or as a separate component in the memory card and operatively connected to the movement sensor and the central processor.

According to a further exemplary aspect there is provided a method for controlling the memory card, wherein the movement sensor is configured to detect a pre-defined acceleration pattern on the basis of at least one acceleration of the memory card and thereafter the central processor executes a pre-specified set of instructions based on the number of successive accelerations.

The at least one acceleration may comprise at least one tap to one of: a body of the digital camera, a display of the digital camera, and a control of the digital camera. The at least one tap may comprise a plurality of taps, the number of taps having different instructions executed. Alternatively, the at least one acceleration may comprise at least one short, sharp shake and/or rotation of the digital camera. The movement sensor may detect a movement of the movement sensor and, if the detected movement is not within at least one predetermined pattern of movement the detected movement may be ignored. Alternatively, if the detected movement is within the at least one predetermined pattern of movement at the central processor may undertake the instructed task. The movement sensor may produce an analog signal that is converted to a digital signal by an analog-to-digital converter. The analog-to-digital converter may be in one of: the movement sensor, the central processor or as a separate component in the memory card and operatively connected to the movement sensor and the central processor.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings.

In the drawings.

DETAILED DESCRIPTION OF THE EXEMPLARY EMBODIMENTS

The exemplary embodiment is a memory card and method for use with a digital camera. The memory card has a movement sensor for the initiation of the storage and wireless transceiving of data.

As shown in FIGS. 1 to 5, there is a digital camera 100 having a slot 102 into which a memory card 200 is able to be inserted and removed in the usual manner.

Figure 1:
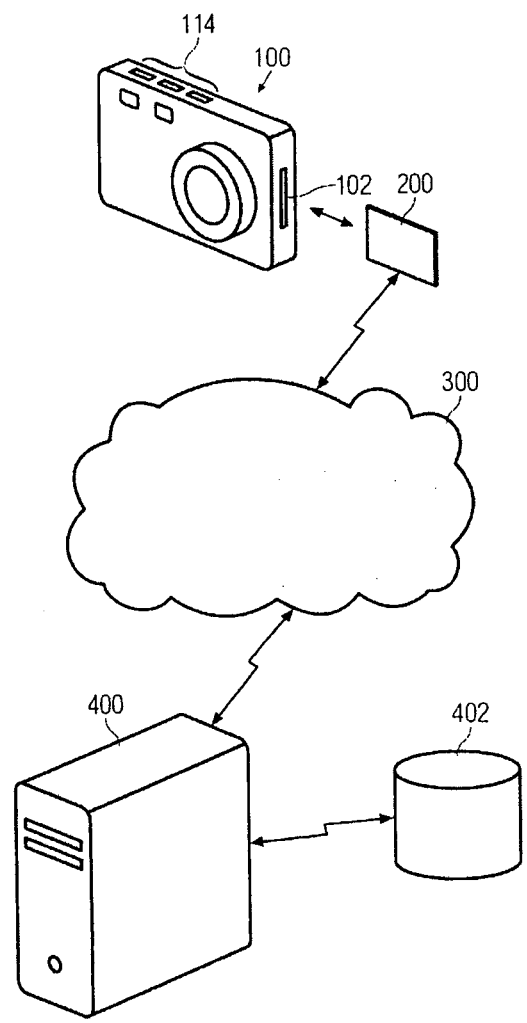
FIG. 1 is a schematic view of an exemplary system of a wireless media connectable to a host device to enable data captured from the host device to be transferred to a server wirelessly or for data residing in the server to be transferred to the wireless media wirelessly.
Figure 2:
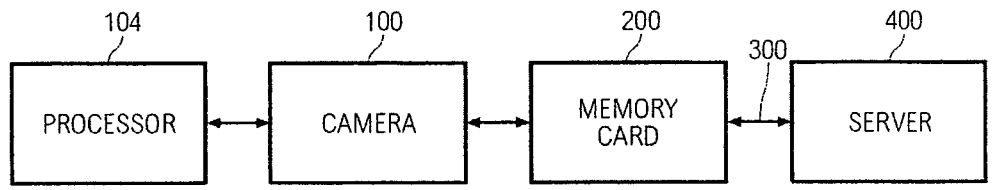
FIG. 2 is a block diagram illustrating the exemplary system of FIG. 1.
Figure 3:
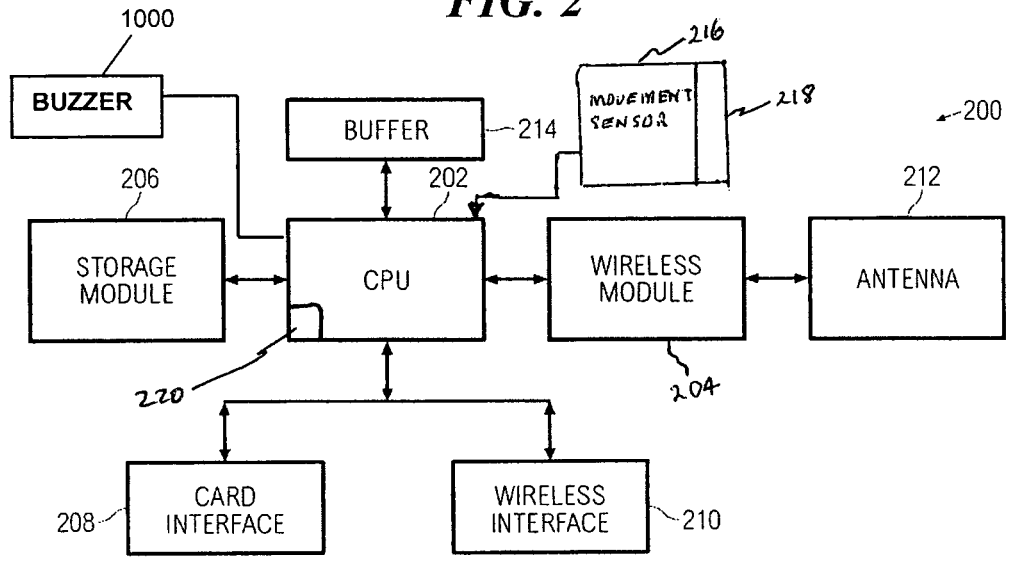
FIG. 3 is an illustration of the wireless media of FIG. 1.
Figure 4:
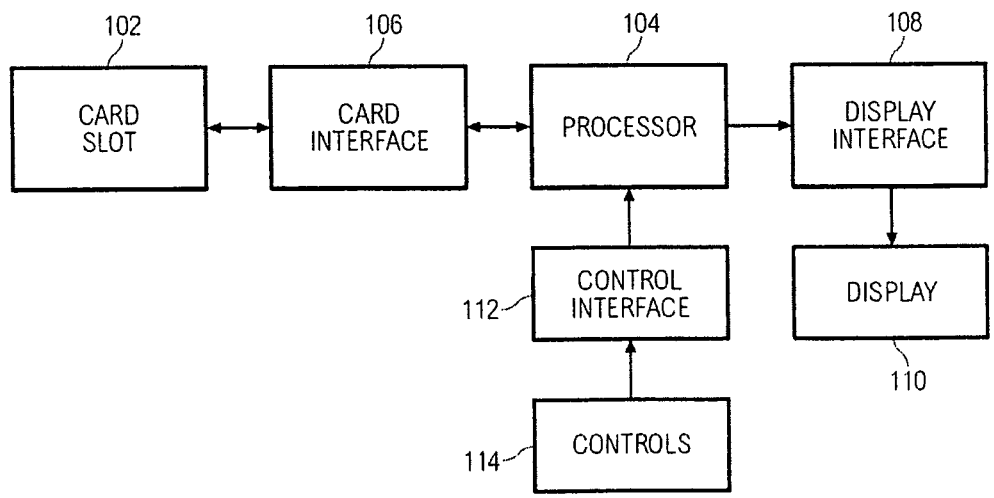
FIG. 4 is an illustration of the processor of the host device of FIG. 1.
Figure 5:
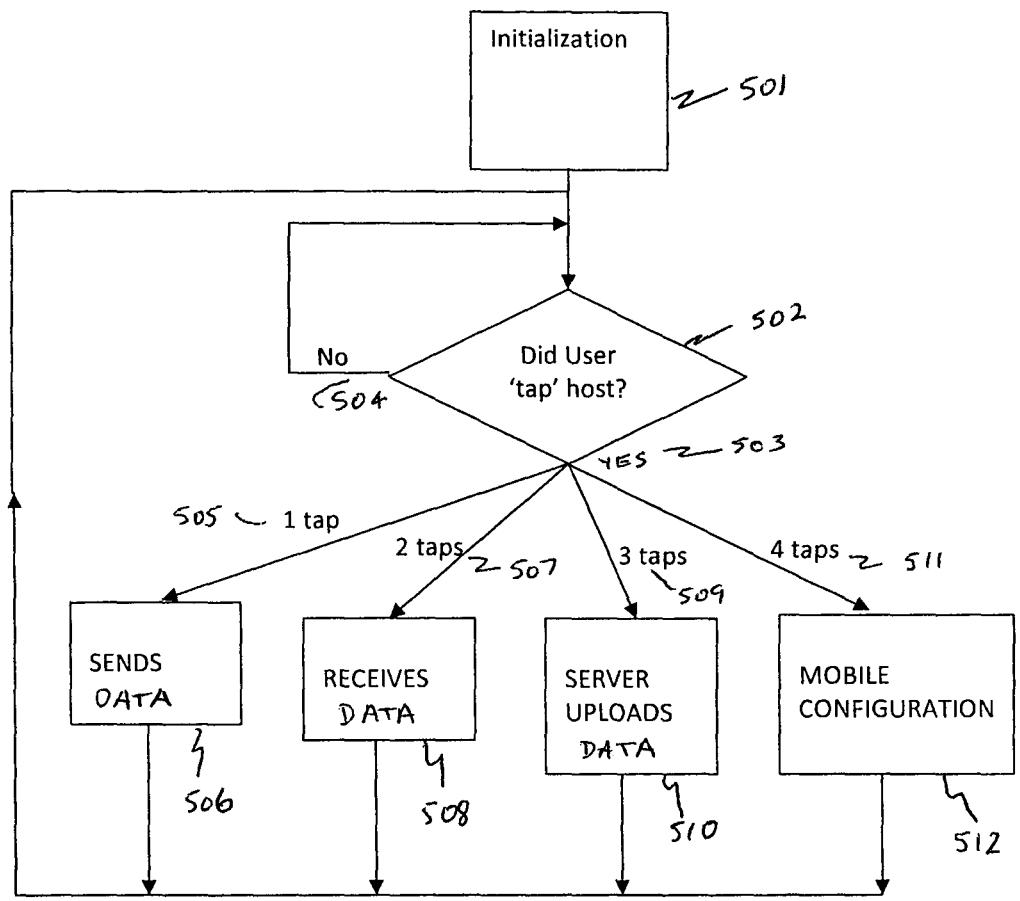
FIG. 5 is a flow chart for the operation of the exemplary embodiment of FIGS. 1 to 4.

The memory card 200 is shown in FIG. 3 and has a central processor 202, a wireless transceiver module 204 operatively connected to the central processor 202, and a storage module 206 operatively connected to the central processor 202. The central processor 202 has a card interface 208 as well as a wireless interface 210. The wireless transceiver module 204 also has an antenna 212. The CPU 202 has a buffer 214 to enable the buffering of data particularly when the wireless transceiver module 204 is sending or receiving data. A buzzer 1000 may be provided to enable audio signals or warnings to be provided. The memory card 200 also has a movement sensor 216 operatively connected to the central processor 202. The movement sensor 216 may be any form of movement feedback device including a uni-axial, bi-axial or tri-axial movement sensor configured to measure gravitational acceleration such as, for example, a motion sensor, accelerometer, or the like. The movement sensor 216 may include an analog-to-digital converter 218, if required or desired. Alternatively, the analog-to-digital converter 218 may form part of the central processor 202 or may be a separate component of the memory card 200 and operatively connected to the movement sensor 216 and the central processor 202.

The digital camera 100 has an inbuilt processor 104 with a card interface 106 for interfacing with the memory card 200 when inserted into slot 102. The inbuilt processor 104 also has a display interface 108 for controlling the display screen 110 of the camera 100. Furthermore, the inbuilt processor 104 has a control interface 112 for enabling the camera controls and so forth 114 to be used to control the operation of the camera 100. The inbuilt processor 104 is incapable of independently exporting digital data externally of the camera 100. By independently exporting it is meant that the processor 104 requires the camera 100 to be operatively connected to an intelligent host such as a computer that has the relevant operative software to enable the export of the data to the computer from the camera, the exporting being under the control of the computer. The normal operation of the camera 100 is under the control of the inbuilt processor 104.

The inbuilt processor 104 is also incapable of independently importing digital data from externally of the camera 100. By independently importing it is meant that the processor 104 requires the camera 100 to be operatively connected to an intelligent host such as a computer that has the relevant operative software to enable the export of the data to the camera from the computer (i.e. import of the data by the camera from the computer), the exporting/importing being under the control of the computer.

Due to the card interface 208, whenever memory card 200 is engaged in the slot 102 of the camera 100, the card interface 106 sees the memory card 200 as a normal memory card and will interface with it in the usual manner for transferring image and/or audio data from the inbuilt processor 104 to the memory card 200. If the card 200 is not of a category recognised by the camera 100, it will display an error message in the normal manner and the process ends.

Once the initial connection between the inbuilt processor 104 and the card 200 is concluded (501), the functional and operational relationship between the memory card 200 and the camera 100 is established between the central processor 202 and the inbuilt processor. The initial and ongoing functionality is in accordance with one or more of our earlier applications except for the user input for providing instructions to the memory card 200.

Here, the user input is at least in part by relying on the output of the movement sensor 216. When the camera 100 is in the appropriate mode and there is a movement of defined characteristics sensed by the movement sensor 216, the appropriate action is taken by the central processor 202. The movement of defined characteristics may be one or more of:
- a user operating one or more of the camera controls 114,
- a user tapping the display 110 of the camera 100,
- a user tapping the body of camera 100, or
- by at least one short, sharp shake and/or rotation of the camera 100.

These movements are able to be detected by the movement sensor 216 and can be differentiated from the normal movements that would be detected during normal operation of the digital camera 100, most of which will be relatively smooth or fluid. The movements of defined characteristics are all relatively short, sharp movements easily able to be executed and therefore detected. As the movements will cause movement of the digital camera 100 in some way, they will cause movement of the memory card 200 and thus the movement sensor 216. The movement sensor 216 can detect and recognize an acceleration pattern on the basis of one single or several successive accelerations, each acceleration being due to movements of the digital camera 100. Therefore, upon there being a movement, the movement sensor 216 will sense the movement and provide an output that is an analog signal. The analog signal will be converted to a digital signal by the analog-to-digital converter 218. The digital signal can be used by the central processor 202. As mentioned previously, the analog-to-digital converter 218 may be part of the movement detector 216, the central processor 202 or may be a separate component.

Any movement detected is compared to at least one predetermined pattern of movement 220 stored in the central processor 202 or stored in the storage module 206 and readable by the central processor 202 (502). If the detected movement is not within the at least one predetermined pattern of movement (504) the detected movement is ignored and the process reverts to (502). If the detected movement is within the at least one predetermined pattern of movement at (502) the result is "yes" (503) and thus the central processor will undertake the instructed task. By way of example only, if the detected movement was:
- a single tap (505) the instruction may be to transmit data (506);
- a double tap (or two taps) (506) the instruction may be to receive data (508);
- three taps (509) the instruction may be to upload data (510);
- four taps (511) the instruction may be to be in a mobile configuration (512). Mobile configuration is where the key pad of a separate mobile/cellular telephone is used to control the operation of the digital camera 100 as is described in application PCT/SG2010/000069 of our earlier applications.

The digital camera 100 and the memory card 200 continue to operate in accordance with one or more of our earlier applications.

Whilst the foregoing description has described exemplary embodiments, it will be understood by those skilled in the technology concerned that many variations in details of design, construction and/or operation may be made without departing from the present invention.

The invention claimed is:

1. A memory card operatively receivable in a digital camera, the memory card comprising:
   a central processor,
   a wireless transceiver module operatively connected to the central processor,
   a storage module operatively connected to the central processor, and
   a movement sensor operatively connected to the central processor and configured to measure gravitational acceleration and provide operational signals to the central processor as a result of a detection of movement of defined characteristics,
   wherein at least one predetermined pattern of movement is stored in the central processor or storage module,
   and wherein the movement sensor is configured to detect and recognize an acceleration pattern on the basis of at least one acceleration of the digital camera and the at least one predetermined pattern of movement.

2. The memory card as claimed in claim 1, wherein the movement sensor comprises a movement feedback device selected from the group consisting of: a uni-axial movement sensor, a bi-axial movement sensor, and a tri-axial movement sensor.

3. The memory card as claimed in claim 1, wherein either the movement sensor or the central processor further comprises an analog-to-digital converter.

4. The memory card as claimed in claim 1 further comprising an analog-to-digital converter operatively connected to the movement sensor and the central processor.

5. A method for controlling a memory card as claimed in claim 1, the memory card being controlled for an action selected from a group consisting of:
   transmitting data, receiving data, uploading data, and instructing the digital camera to be in a mobile configuration.

6. A method as claimed in claim 5, wherein the at least one acceleration comprises at least one tap to one of: a body of the digital camera, a display of the digital camera, and a control of the digital camera, the at least one tap comprises a plurality of taps, the number of taps having different operational results.

7. A method as claimed in claim 6, wherein the movement sensor detects a movement of the movement sensor and, if the detected movement is not within at least one predetermined pattern of movement the detected movement is ignored; and if the detected movement is within the at least one predetermined pattern of movement, the central processor will undertake the instructed task.

8. A method as claimed in claim 5, wherein the at least one acceleration comprises either at least one short, sharp shake or at least one short, sharp rotation of the digital camera.

9. A method as claimed in claim 5, wherein the movement sensor produces an analog signal that is converted to a digital signal by an analog-to-digital converter, the analog-to-digital converter being in one of: the movement sensor, the central processor or as a separate component in the memory card and operatively connected to the movement sensor and the central processor.

10. A method for controlling the memory card as claimed in claim 1, the memory card being controlled for an action selected from a group consisting of:

transmitting data, receiving data, uploading data, and instructing the digital camera to be in a mobile configuration, wherein the movement sensor is configured to detect a pre-defined acceleration pattern on the basis of at least one acceleration of the memory card and thereafter the central processor executes a pre-specified set of instructions based on the number of successive accelerations and wherein the movement sensor detects a movement of the movement sensor and, if the detected movement is not within at least one predetermined pattern of movement the detected movement is ignored; and if the detected movement is within the at least one predetermined pattern of movement, the central processor will undertake the instructed task.

11. A method as claimed in claim 10, wherein the at least one acceleration comprises at least one tap to one of: a body of the digital camera, a display of the digital camera, and a control of the digital camera, the at least one tap comprises a plurality of taps, the number of taps having different instructions executed.

12. A method as claimed in claim 10, wherein the at least one acceleration comprises either at least one short, sharp shake or at least one short, sharp rotation of the digital camera.

13. A method as claimed in claim 10, wherein the movement sensor produces an analog signal that is converted to a digital signal by an analog-to-digital converter, the analog-to-digital converter being in one of: the movement sensor, the central processor or as a separate component in the memory card and operatively connected to the movement sensor and the central processor.

14. A method for controlling a digital camera with a memory card slot, using at least one predetermined pattern of movement, the method including:

inserting a memory card with a movement sensor into the memory card slot, the memory card being operatively received in the digital camera;

moving the digital camera using the at least one predetermined pattern of movement;

recognizing the at least one predetermined pattern of movement using the movement sensor and outputting an analog signal;

converting the analog signal to a digital signal using the movement sensor;

providing the digital signal from the movement sensor to a processor of the memory card; and instructing the digital camera to be in a mobile configuration, wherein the digital camera is controllable using a separate telecommunications device in the mobile configuration.

15. The method of claim 14, wherein the at least one predetermined pattern of movement is selected from a group consisting of: at least one tap on the host device, at least one short shake, at least one sharp shake and rotation of the host device.

16. The method of claim 14, wherein the separate telecommunications device is a mobile telephone.

* * * * *